United States Patent [19]

Spires et al.

[11] 3,744,807
[45] July 10, 1973

[54] ADAPTER FOR PIPE MACHINE POWER

[76] Inventors: Archie R. Spires, 983 Lancaster Avenue; William H. Routt, 6862 Ardelle Drive, both of Reynoldsburg, Ohio

[22] Filed: June 1, 1971

[21] Appl. No.: 148,311

[52] U.S. Cl.................. 279/1 A, 10/107 R, 82/4 C, 269/131, 269/282
[51] Int. Cl.......................... B23b 31/00, B25b 1/20
[58] Field of Search ................ 269/9, 88, 130, 131, 269/282; 279/1 A, 1 R; 408/104; 10/89 R, 89 H, 89 P, 107 R, 107 PH; 82/4 C

[56] References Cited
UNITED STATES PATENTS

| | | | |
|---|---|---|---|
| 2,492,783 | 12/1949 | Chamberlain.................. | 269/130 X |
| 3,445,871 | 5/1969 | Blake............................... | 10/89 R X |
| 2,191,191 | 2/1940 | Pealer.............................. | 10/89 R |

*Primary Examiner*—Gil Weidenfeld
*Attorney*—Jerome R. Cox

[57] ABSTRACT

An adapter for increasing the pipe diameter capacity of a pipe machine power drive. The adapter has a cylindrical shaft secured in the power drive chuck and a channel member welded to and extending longitudinally from the shaft in a position parallel to and radially offset from the axis of the shaft. Serrated jaw inserts are provided in the channel to grip a pipe segment and center it coaxially with the axis of rotation. A chain gripping means clamps the pipe segment against the serrated jaw inserts.

6 Claims, 8 Drawing Figures

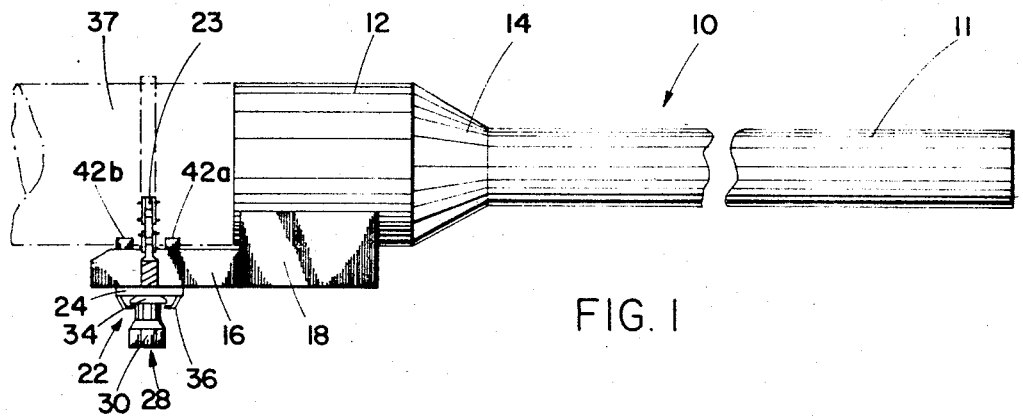
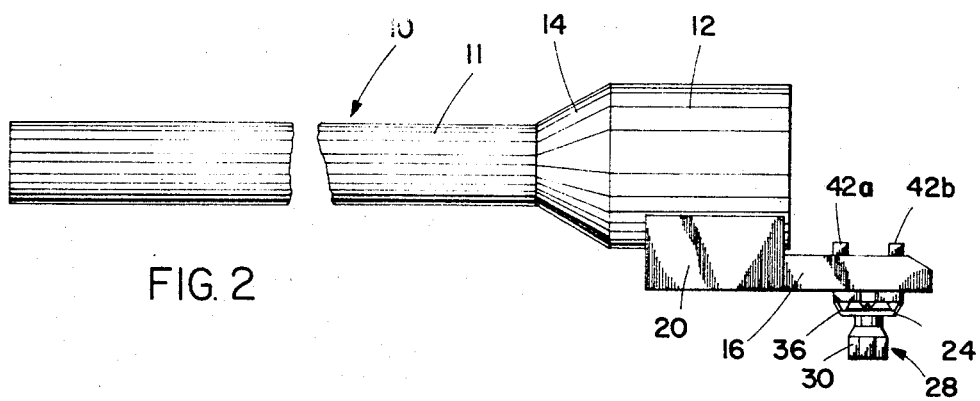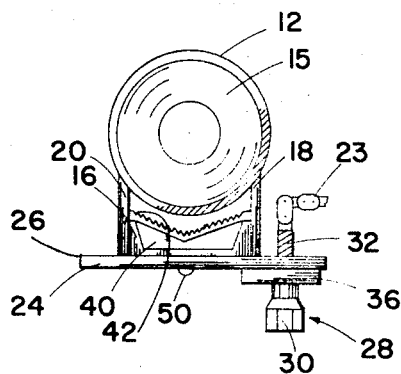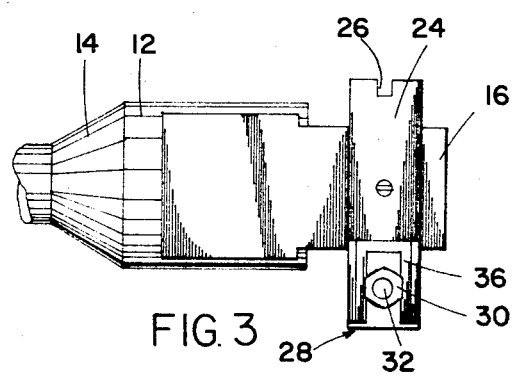

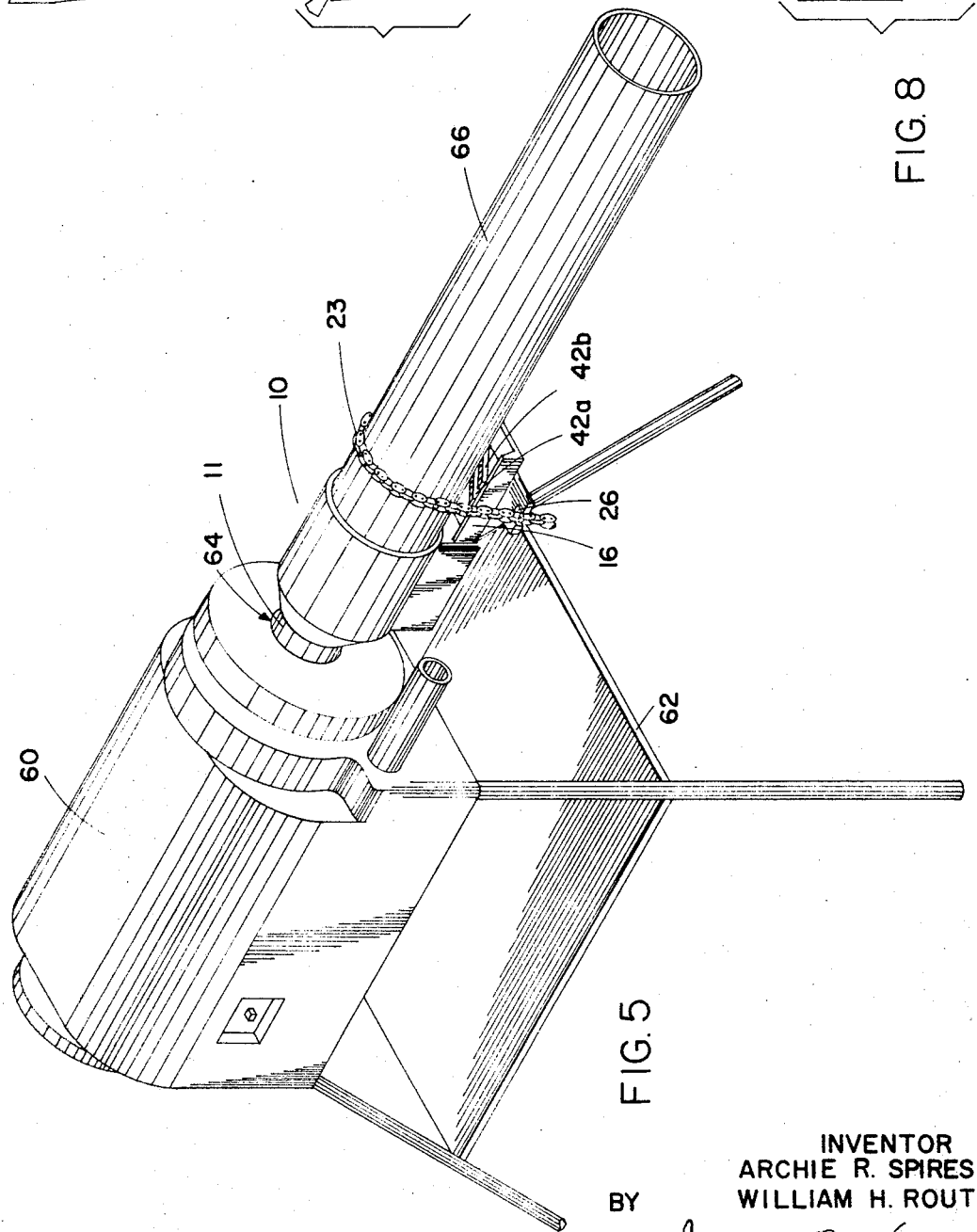

ADAPTER FOR PIPE MACHINE POWER

BACKGROUND OF THE INVENTION

This invention relates generally to pipe fitting tools and more particularly relates to an adapter for permitting use of a power drive for pipes which are larger in diameter than the capacity of the rotatable chuck of the power drive.

A power drive is a fundamental tool of modern plumbers and pipe fitters. It ordinarily has a rotatable chuck which is drivingly connected by gears to an electric motor. A work piece, which is normally a pipe segment, is clamped in the jaws of the chuck and rotated by the power drive. A pipe cutting or threading tool may then be engaged to the pipe segment and retained against rotation for cutting or threading the pipe segment.

The maximum pipe diameter capacity which a power drive can accept is limited by the maximum size to which the chuck can be adjusted. For example, a chuck may receive a maximum pipe diameter of 2 inches. This may be entirely satisfactory for the majority of the power drive operations. However, often a power drive is needed which can accept a larger pipe diameter. Although most pipes used on a job may be 2 inches or less, some may be 3 inches or 4 inches or more for example.

One solution to this problem would, of course, be that a power drive having a chuck with a larger capacity could be purchased. This, however, may not be economically practical in view of the infrequent use of such a larger power drive. Such larger capacity power drives are very expensive, and more importantly, they are so heavy that it is practically impossible for one or even two men to handle them conveniently on a job in the field.

There is, therefore, a need for an inexpensive adapter which may be quickly and easily installed in a power drive to permit use of the normally available power drive for larger diameter pipes.

SUMMARY OF THE INVENTION

This invention is a power drive adapter for increasing the pipe diameter capacity of a power drive. The adapter has a sufficiently small clamping shaft for being clamped in the rotatable chuck of the power drive for securing the adapter thereto. A mounting arm is rigidly fixed to the clamping shaft and aligned substantially parallel to and radially offset from the axis of the clamping shaft for attachment to a segment of pipe. A gripping means is attached to the mounting arm for removably securing a segment of pipe to the mounting arm.

It is therefore an object of the invention to provide an adapter for improving the capabilities of a power drive.

Another object of the invention is to provide an adapter which may be quickly, simply, and easily mounted in the chuck of a power drive and to which pipes may be easily attached.

BRIEF DESCRIPTION OF THE DRAWINGS

FIG. 1 is a view in side elevation of an adapter constructed according to the invention;

FIG. 2 is a view in side elevation of the opposite side of the adapter illustrated in FIG. 1;

FIG. 3 is a bottom view of a segment of the adapter illustrated in FIGS. 1 and 2;

FIG. 4 is an end view of the adapter illustrated in FIG. 1;

FIG. 5 is a view in perspective illustrating the adapter of FIG. 1 mounted in a power drive and having a pipe segment workpiece mounted therein;

FIG. 6 is a view in side elevation of one of the insert blocks intended to be used in cooperation with a serrated insert to position a segment of pipe in concentric relationship;

FIG. 7 is a view in side elevation of a different sized insert block and the serrated insert associated therewith, and of a screw by which the two parts of the insert are secured to each other; and FIG. 8 is a view in end elevation of the insert shown in FIG. 7 showing not only the screws for securing the insert block and the serrated insert to each other but also a screw for securing the complete insert to the support.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

DETAILED DESCRIPTION

Referring now to FIGS. 1 through 4, the power drive adapter 10 has a clamping shaft 11 which is sufficiently small in diameter that it may be clamped in the rotatable chuck of a power drive. A cylindrical tube 12 is attached to, and in exact axial alignment with, the clamping shaft 11 by means of an intermediately welded axially aligned frusto-conical end cap 14 which is also in exact axial alignment. As shown in FIG. 4, the end cap has a frusto-conical interior 15 formed therein which is also axially aligned with the shaft 11, the tube 12, and the cap 14. A mounting arm 16 is welded to a pair of side panels 18 and 20 which in turn are welded to the cylindrical tube 12. The mounting arm 16 is rigidly fixed to the clamping shaft 11 through the side panels 18 and 20, the cylindrical tube 12, and the end cap 14.

The preferred mounting arm 16 is a channel beam having its channel facing radially inwardly toward the center or axis of the cylindrical tube 12. The mounting arm 16 is aligned substantially parallel to and radially offset from the axis of the tube 12 and the clamping shaft 11. Thus, the diameter of the cylindrical tube 12 may be advantageously made larger than the diameter of the segments of pipe to be attached to the adapter in order that the mounting arm 16 may be sufficiently offset from the axis of the clamping shaft 11 to permit centering of relatively large pipe segment workpieces.

A gripping means, indicated generally as 22 in FIG. 1 is attached to the mounting arm 16 for removably securing a segment of pipe to the mounting arm 16. Although various types of gripping means could be employed, we prefer a chain type clamp which is attached at one end to the mounting arm 16 and which after passing around the pipe is removably attached at its other end also to the mounting arm 16.

The chain is attached to the arm 16 by a cross member 24. The cross member 24 is rigidly mounted laterally across the underside of the mounting arm 16. A yoke 26 is formed in one end of the cross member 24 on one side of the mounting arm 16. The yoke 26 has bifurcations which are spaced to removably receive one end of the chain 23. The bifurcations seat against the links of the chain to prevent longitudinal movement of the chain. Thus, the chain 23 may be inserted into the yoke 26 and retained against longitudinal movement.

A chain tightening means 28 is provided on the opposite end of the cross beam 24 and therefore on the opposite side of the mounting arm 16 from the yoke 26. The preferred chain tightening means 28 is a hex headed nut member 30 which threadedly engages a threaded tightening rod 32. The tightening rod 32 extends through a hole in the cross member 24. Rotation of the nut member moves the tightening rod axially through the nut member 30. When the chain 23 is loosened, the nut member 30 is retained against falling away from the cross member 24 by an annular flange 34 provided on the nut member 30 which cooperates with a retaining track 36 extending downwardly from the underside of the cross member 24.

Thus, a pipe segment 37, illustrated in phantom in FIG. 1, may be inserted in the adapter and the chain 23 may be extended from one side of the channel beam mounting arm 16 fairly tightly around the pipe segment 37 to the other side of the mounting arm 16 and then inserted in the yoke 26. The nut member 30 is then rotated by means of a wrench, for example, to draw the tightening rod 32 downwardly as shown in FIG. 1 to tighten the chain 23 and thus tighten the pipe segment in the mounting arm 16.

If the channel beam mounting arm 16 were suitably radially spaced from the axis of the clamping shaft 11, then a pipe segment 37 of a specific diameter could be seated directly in the channel of the mounting arm 16. However, in order to provide for improved gripping of the pipe and in order to accommodate pipe segments of various diameters, we provide several sets of jaw inserts. A selected set of jaw inserts is positioned in the channel of the mounting arm 16 to receive the exterior of the pipe segment 37.

FIGS. 1, 2, and 4 illustrate one set of such jaw inserts and FIGS. 6 and 7 illustrate additional inserts. Each jaw insert includes an insert block such as 40 in FIG. 4 or such as 40a or 40b (FIGS. 6, 7, and 8) and a serrated insert such as 42 secured thereto. The set of jaw inserts comprising for example, the insert block 40 and a serrated insert 42 are mounted in the channel of the mounting arm 16 and are provided with inwardly extending serrated faces such as the faces 42a and 42b of the serrated insert 42 illustrated in FIGS. 1 and 2. The jaw insert faces seat against the exterior of a pipe segment to prevent rotation of the pipe segment relative to the adapter. Of course, tightening of the chain clamping means 22 clamps the pipe segment against the serrated faces of the jaw inserts.

Each jaw insert has a radially aligned thickness for spacing a pipe segment having a certain diameter sufficiently from the mounting arm 16 to align the longitudinal axis of the pipe segment coaxially with the longitudinal axis of the clamping shaft 11, the tube 12, the conical cap 14 and its interior 15. The thinnest jaw insert 40–42 has a thickness which is correct for positioning the largest diameter pipe to be used with the apparatus. Thicker jaw inserts such as 40–42 and 40b–42 are so designed that they are correct for positioning smaller diameter pipe which may be used with the apparatus, except that it is probably unnecessary to provide jaw inserts useful in holding pipe inserts having a diameter which could be handled by the original chuck. The inserts could be made integral and consist of a block such as blocks 40a or block 40b having a pair of parallel serrated upper surface for gripping the pipe. However, we prefer, for purposes of economy, to use a plurality of blocks such as 40, 40a and 40b and have only one H-shaped serrated member 42 which can be attached to and will cooperate with any selected one of the block inserts. Although we show only three such block inserts 40, 40a and 40b, actually in practice we use four or five or six such blocks, each for a different size pipe segment. For example, only, such a block thicker than 40a might be used for 2 ½ inch pipe, the block 40a might be used for 3-inch pipe, a block intermediate in thickness between 40a and 40b might be used for 3 ½ inch pipe, a block 40b might be used for 4 inch pipe, and the still thinner block 40 might be used for 4 ½ inch pipe.

A block, as for example, 40 is secured to the H-shaped serrated insert by a pair of screws such as 44. In this manner, each pipe segment work piece is centered on the axis of rotation so that it will rotate concentrically and will not rotate eccentrically.

As explained in detail above, we prefer to provide several such jaw inserts having various thicknesses in order to accommodate pipe segments of various sizes.

Each jaw insert will have a thickness in the radial direction to properly position its corresponding size pipe. Each of the block inserts (as for example, jaw inserts 40, 40a and 40b) is provided with a pair of bores extending through the block and also an intermediate bore aligned with the other two bores but extending only part way upward through the block. The intermediate bore is tapped.

A hole is formed through the cross member 24 and a similar registering hole is formed in the mounting beam 16 and aligned with the intermediate bore in the insert. In this manner, small screw 50 may be inserted upward through the cross member 24, then through the arm 16, and finally threadedly engaged in the jaw insert to attach the jaw insert firmly to the mounting arm 16.

FIG. 5 illustrates a power drive 60 mounted on a suitable stand 62. The power drive has a chuck 64 which receives the clamping shaft 11 of the adapter 10. A pipe segment 66 seats against the upper faces 42 and 42a of the jaw insert 40 and is clamped in the adapter by the chain 23. The chain is inserted and held in the yoke 26.

To operate the invention as illustrated in FIG. 5, the adapter 10 is lifted into position and its clamping shaft 11 is inserted in the chuck 64 of the power drive 60. The proper set of inserts 40–42 is then selected according to the diameter of the pipe segment 66 on which it is intended to work. The jaw insert blocks are advantageously marked with the pipe diameter for which they are suited. They will have a radial thickness to position the pipe segment 66 coaxially with the axis of rotation of the power drive 60. The properly selected jaw inserts are inserted in the channel beam mounting arm 16 and tightened into position by the screw 50 (not visible in FIG. 5). The pipe segment 66 is lifted into position on the jaw inserts 40 and 42 and its outer end supported in any convenient manner, and assuming its diameter is less than the diameter of the tube 12, its inner end may be advantageously inserted through the tube 12 to bottom and be supported and correctly positioned by the tapered sides of the end cap interior 15. The insertion in the tube 12 and the abutment against the sides of the interior 15 is not necessary inasmuch as the device operates without such cooperation. However, use of the tapered recess is convenient, adds stability, and insures concentricity. The chain 23 is extended from the tightening rod (not visible in FIG. 5) around the pipe segment 66 and pulled snugly so that its end may be slid into the yoke 26. The chain 23 is then tightened by tightening the chain tightening means which although not visible is similar to the means 28 illustrated in FIGS. 1 through 4. The nut member such as 30 is rotated by a wrench or alternatively by a permanently attached handle to pull the tightening rod 32 downwardly through the nut member until the chain firmly tightens the pipe segment against serrated jaw inserts 40 and 42. The electric motor of the power drive 60 is then actuated to rotate, as an entire unit, the adapter together with the pipe segment 66.

It is to be understood that while the detailed drawings and specific examples given describe the preferred embodiment of the invention, they are for the purposes of illustration only, that the apparatus of the invention is not limited to the precise details and conditions disclosed and that various changes may be made therein without departing from the spirit of the invention which is defined by the following claims.

We claim:

1. A power drive adapter for increasing the pipe diameter capacity of a power drive, having a rotatable chuck, so as to drive a larger diameter pipe, said adapter comprising:
   a. a sufficiently small clamping shaft for being clamped in the rotatable chuck of said power drive for securing said adapter thereto;
   b. a mounting arm rigidly fixed to the clamping shaft, aligned substantially parallel to and radially offset from the axis of the clamping shaft, and extending longitudinally beyond the small clamping shaft to provide a portion of the mounting arm which is aligned with, parallel to and coextensive with the intended operative position of a segment of said larger diameter pipe, for attachment to said segment of said pipe;
   c. a gripping means attached to the portion of said mounting arm which extends longitudinally beyond the small clamping shaft for removably securing said segment of pipe to said mounting arm to hold said pipe in axial alignment with the small clamping shaft ;
   whereby said segment of pipe may be secured to said mounting arm by said gripping means and rotated by actuation of the power drive rotatable chuck clamped to said clamping shaft ;
   wherein said mounting arm comprises a channel beam having its channel facing radially inwardly; and a jaw insert mounting in said channel and provided with inwardly extending serrated faces for seating against the exterior of the pipe segment to align said pipe segment and to prevent rotation of the pipe segment relative to said adapter, the jaw insert having a radially aligned thickness for spacing the pipe segment sufficiently from the mounting arm to align the longitudinal axis of the pipe segment coaxially with the axis of rotation of said chuck.

2. A power drive adapter according to claim 1, wherein in the gripping means comprises a chain having a series of links attached at one end to the channel beam and removably attachable at its other end to said channel beam; and chain tightening means mounted to said channel beam and cooperating with said chain for adjustably applying tension to said chain, wherein said chain is extendible from said channel beam, tightly around said pipe segment to said channel beam, for tightening said pipe segment against said serrated faces of the jaw insert.

3. A power drive adapter according to claim 2, wherein a yoke is provided on one side of said channel beam having spaced bifurcations to removably receive one end of said chain and seat against a link to prevent longitudinal movement of the chain and wherein the opposite end of the chain is attached to a chain tightening means for longitudinal movement therewith; the chain tightening means comprising a threaded shank threadedly engaged to a rotatable nut member which is retained against axial movement.

4. A power drive adapter for increasing the pipe diameter capacity of a power drive, having a rotatable chuck, said adapter comprising:
   a. a sufficiently small clamping shaft for being clamped in the rotatable chuck of said power drive for securing said adapter thereto;
   b. a mounting arm rigidly fixed to the clamping shaft and aligned substantially parallel to and radially offset from the axis of the clamping shaft, for attachment to a segment of pipe;
   c. a gripping means attached to said mounting arm for removably securing a segment of pipe to said mounting arm;
   wherein a segment of pipe may be secured to said mounting arm by said gripping means and rotated by actuation of the power drive rotatable chuck clamped to said clamping shaft,
   wherein said mounting arm comprises a channel beam having its channel facing radially inwardly; and a jaw insert mounted in said channel and provided with inwardly extending serrated faces for seating against the exterior of a pipe segment to align said pipe segment and to prevent rotation of the pipe segment relative to said adapter, the jaw insert having a radially aligned thickness for spacing the pipe segment sufficiently from the mounting arm to align the longitudinal axis of the pipe segment coaxially with the axis of rotation of said chuck,
   wherein the gripping means comprises a chain having a series of links attached at one end to said channel beam and removably attachable at its other end to said channel beam;
   and chain tightening means mounted to said channel beam and cooperating with said chain for adjustably applying tension to said chain, wherein said chain is extendible from said channel beam, and may be placed tightly around said pipe segment to said channel beam, for tightening said pipe segment against said serrated faces of the jaw insert,
   wherein said clamping shaft is a cylindrical shaft welded coaxially at one end to one side of an end cap, and a cylindrical tube having a diameter larger than the diametrical capacity of said power drive is welded coaxially to the end cap and extends away from said cylindrical shaft; and said channel beam is welded to the wall of said tube.

5. A power drive adapter according to claim 4, wherein a yoke is provided on one side of said channel beam having bifurcations spaced to removably receive one end of said chain and seat against a link to prevent longitudinal movement of the chain and wherein the opposite end of the chain is attached to a chain tightening means, for longitudinal movement therewith, which comprises a threaded shank which is threaded-engaged to a rotatable nut member which is retained against axial movement relative to said channel beam.

6. A power drive adapter for increasing the pipe diameter capacity of a power drive, having a rotatable chuck, said adapter comprising:

a. a sufficiently small clamping shaft for being clamped in the rotatable chuck of said power drive for securing said adapter thereto;

b. a mounting arm rigidly fixed to the clamping shaft and aligned substantially parallel to and radially offset from the axis of the clamping shaft, for attachment to a segment of a pipe;

c. a gripping means attached to said mounting arm for removably securing a segment of pipe to said mounting arm;

wherein a segment of pipe may be secured to said mounting arm by said gripping means and rotated by actuation of the power drive rotatable chuck clamped to said clamping shaft, wherein the mounting arm is attached to the clamping shaft by an end cap having a frustoconical interior, and by a cylindrical tube secured to the larger end of the end cap;

whereby the pipe segment may be inserted through the tube and abutted against the sides of the recess to aid in the support of the pipe segment and aid in positioning the pipe segment in alignment with the axis of the chuck.

* * * * *